UNITED STATES PATENT OFFICE.

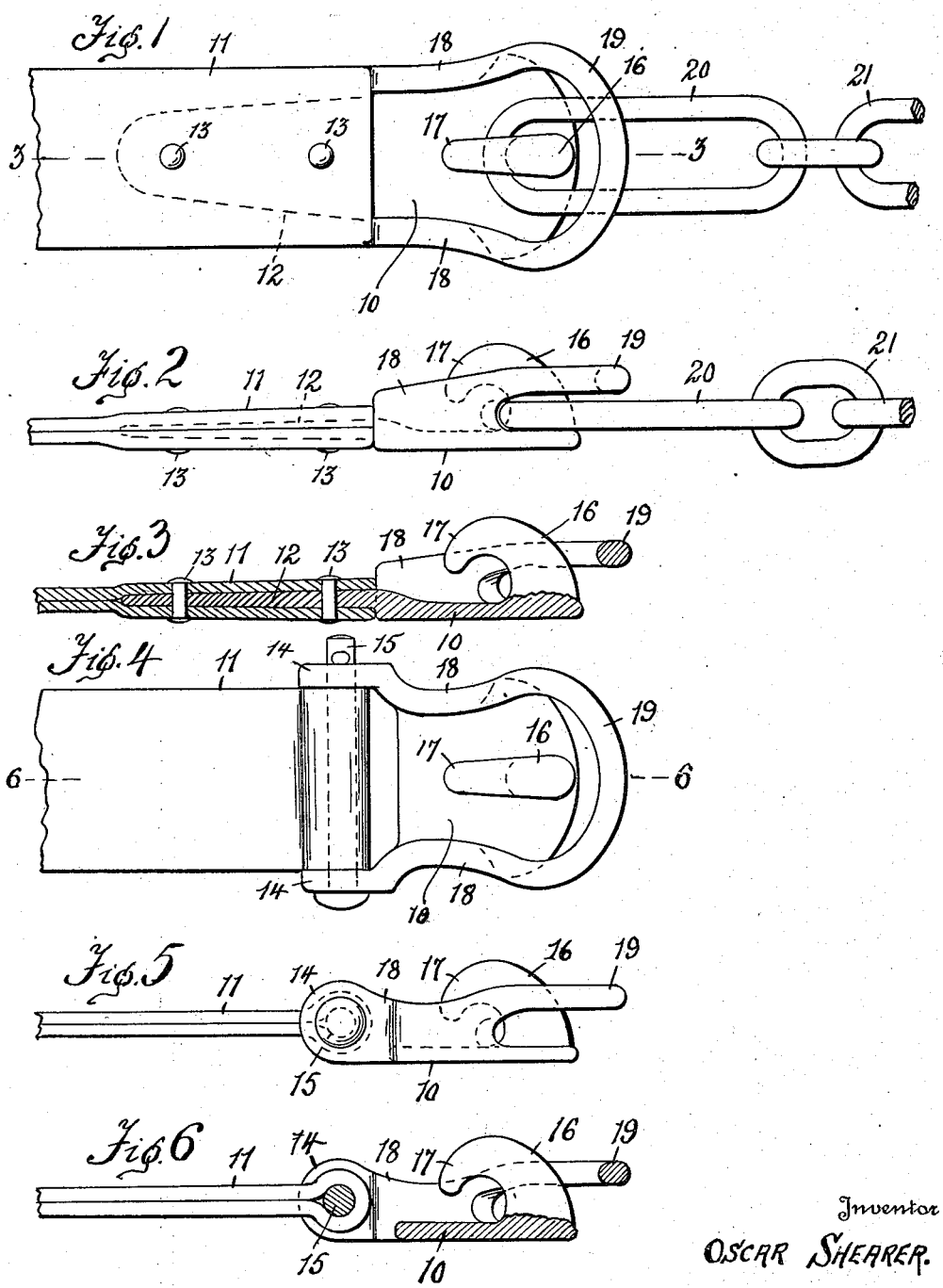

OSCAR SHEARER, OF COLFAX, WASHINGTON.

TRACE-HOOK.

1,216,860.  Specification of Letters Patent.  Patented Feb. 20, 1917.

Application filed May 2, 1916. Serial No. 94,924.

*To all whom it may concern:*

Be it known that I, OSCAR SHEARER, a citizen of the United States, residing at Colfax, in the county of Whitman and State of Washington, have invented certain new and useful Improvements in Trace-Hooks, of which the following is a specification.

This invention relates to improvements in trace hooks and has for one of its objects to simplify and improve the construction and increase the efficiency and utility of devices of this character.

Another object of the invention is to provide a simply constructed device of this character whereby the terminal chains by which the whiffle trees are connected to the traces may be quickly coupled and uncoupled without detaching any of the parts, and whereby the coupling medium is prevented from becoming accidentally displaced no matter to what rough uses the parts may be subjected.

Another object of the invention is to provide a device of this character having no projecting parts which are liable to engage surrounding objects.

With these and other objects in view, the invention consists in certain novel features of construction, as hereinafter shown and described and then specifically pointed out in the claim; and in the drawings illustrative of the preferred embodiment of the invention—

Figure 1 is a side elevation of a portion of a draft trace and a portion of one of the coupling chains with the improvement applied to the trace;

Fig. 2 is a plan view of the parts shown in Fig. 1;

Fig. 3 is a section on the line 3—3 of Fig. 1;

Fig. 4 is a view similar to Fig. 1 illustrating a modification in the manner of connecting the draft trace to the device;

Fig. 5 is a plan view of the parts shown in Fig. 4;

Fig. 6 is a longitudinal section on the line 6—6 of Fig. 4.

Corresponding and like parts are referred to in the following description and indicated in all the views of the drawings by the same reference characters.

The improved device comprises a flat base portion 10 having means for attachment to a draft trace, a portion of which is represented at 11. Any suitable means may be employed for attaching the body portion 10 to the trace, and it is not desired, therefore, to limit the invention in any manner in this respect, but traces are usually coupled to devices of this character either by a tongue, indicated at 12, and embedded between the plies of the trace and secured by rivets or like devices 13, as shown in Figs. 1, 2 and 3, or by forming ears 14 integral with the body 10 and through which a pin 15 engages, the trace 11 being engaged at one end around the pin, as shown in Figs. 4, 5 and 6.

Rising from the body 10 is a stud represented as a whole at 16 and curving toward the trace attaching portion and likewise toward the body 10, as illustrated at 17. Rising from the portion of the body or base 10 next to the trace engaging portion are side portions 18, and extending from the upper edges of the side portions is a loop 19, the curved outer portion of the stud 16 extending above the line of the loop, as shown in Figs. 2, 3, 5 and 6. The body 10, the tongue 12, the studs 16—17 and the side portions 18 and loop 19 are formed in one single piece or casting, preferably malleable iron or steel, when the device is constructed as shown in Figs. 1, 2 and 3, and when constructed in the form shown in Figs. 4, 5 and 6 the body 10, side portions and loops 18—19 and the ears 14, together with the studs 16—17, will likewise be formed in one single piece, preferably malleable iron or steel. The parts will be constructed as light as possible consistent with the strains to which they will be subjected.

The improved device is designed to receive the terminal link 20 of the chain member which is usually employed between the trace and the whiffle tree in the heavier class of harnesses, and in Figs. 1 and 2 the link is shown coupled over the studs 16—17. In coupling the link to the device one end of the link is thrust beneath the loop 19 and passed over the stud 16 and beneath its hooked terminal 17 thus disposing the link in the position shown in Figs. 1 and 2, and when strain is applied to the chain, a portion of which is represented at 21, the link will be firmly and effectually coupled to the trace, and all danger of displacement obviated, as the link can be uncoupled only by reversing the operation whereby the link was coupled with the studs, and these movements can never take place except the parts be manually operated. So long as strain is applied the link will not be disconnected from the stud, and no matter how loosely the chain may be disposed, or how roughly the parts may be shaken about, they will not become uncoupled.

The improved device is simple in construction, can be inexpensively manufactured and varied in size to adapt the device to draft traces of varying sizes.

The improved device will be found especially efficient when employed upon draft harnesses used in farm work, especially when hauling logs and like operations, and likewise in other forms of farm work.

Having thus described the invention, what is claimed as new is:

A device of the class described comprising a body including spaced sides connected by a transverse loop extending in advance of the sides, and a hooked stud carried by said body with the body portion of the stud extending above the upper line of the loop and of the spaced sides, and with the open end of the stud intermediate the sides and below the upper line of the side portions and the loop.

In testimony whereof I affix my signature.

OSCAR SHEARER. [L. S.]

Copies of this patent may be obtained for five cents each, by addressing the "Commissioner of Patents, Washington, D. C."